(12) United States Patent
Gustafson et al.

(10) Patent No.: US 7,823,141 B1
(45) Date of Patent: Oct. 26, 2010

(54) USING A CONCURRENT PARTIAL INSPECTOR LOOP WITH SPECULATIVE PARALLELISM

(75) Inventors: Phyllis E. Gustafson, Pleasanton, CA (US); Michael H. Paleczny, San Jose, CA (US); Christopher A. Vick, San Jose, CA (US); Olaf Manczak, Hayward, CA (US); Jay R. Freeman, Palo Alto, CA (US); Yuguang Wu, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1426 days.

(21) Appl. No.: 11/240,963

(22) Filed: Sep. 30, 2005

(51) Int. Cl.
*G06F 9/45* (2006.01)
*G06F 9/30* (2006.01)
*G06F 7/38* (2006.01)

(52) U.S. Cl. ............. 717/160; 717/149; 717/150; 717/155; 712/218; 712/235

(58) Field of Classification Search ............... None
See application file for complete search history.

(56) References Cited

U.S. PATENT DOCUMENTS

| | | | | |
|---|---|---|---|---|
| 5,812,811 A * | 9/1998 | Dubey et al. | ............... | 712/216 |
| 5,842,022 A * | 11/1998 | Nakahira et al. | ............ | 717/160 |
| 5,852,734 A * | 12/1998 | Komatsu et al. | ............ | 717/156 |
| 6,212,542 B1 * | 4/2001 | Kahle et al. | ................. | 718/102 |
| 6,247,173 B1 * | 6/2001 | Subrahmanyam | ........... | 717/160 |
| 6,490,594 B1 * | 12/2002 | Lomet | ........................ | 707/200 |
| 6,615,340 B1 * | 9/2003 | Wilmot, II | .................. | 712/209 |
| 6,708,331 B1 * | 3/2004 | Schwartz | ..................... | 717/160 |
| 7,089,545 B2 * | 8/2006 | Bera | .......................... | 717/160 |
| 7,107,583 B2 * | 9/2006 | Hobbs et al. | ................. | 717/150 |
| 7,496,918 B1 * | 2/2009 | Dice et al. | ................... | 718/100 |
| 2004/0073906 A1 * | 4/2004 | Chamdani et al. | ........... | 718/102 |
| 2004/0098711 A1 * | 5/2004 | Song et al. | ................... | 717/150 |
| 2004/0117781 A1 * | 6/2004 | Bera | .......................... | 717/160 |
| 2004/0123280 A1 * | 6/2004 | Doshi et al. | ................. | 717/161 |
| 2004/0205740 A1 * | 10/2004 | Lavery et al. | ................ | 717/151 |
| 2005/0028157 A1 * | 2/2005 | Betancourt et al. | ......... | 718/100 |
| 2005/0216705 A1 * | 9/2005 | Shibayama et al. | ......... | 712/216 |

OTHER PUBLICATIONS

Bruening, et al.; "Softspec: Software-based Speculative Parallelism"; Laboratory for Computer Science, MIT, $3^{rd}$ ACM Workshop on Feedback-Directed and Dynamic Optimization (FDDO-3), Dec. 10, 2000; (10 pages).

(Continued)

*Primary Examiner*—Tuan Q Dam
*Assistant Examiner*—Isaac T Tecklu
(74) *Attorney, Agent, or Firm*—Osha • Liang LLP

(57) ABSTRACT

A method for executing a loop in an application that includes executing iterations in a first segment of the loop by a base thread, logging memory transactions that occur during execution of iterations in the first segment by a co-inspector thread to obtain a co-inspector log, executing iterations in a second segment of the loop by a co-thread to obtain temporary results, logging memory transactions that occur during execution of iterations in the second segment to obtain a co-thread log, and comparing the co-inspector log and the co-thread log to determine whether a thread interdependency exists.

12 Claims, 6 Drawing Sheets

OTHER PUBLICATIONS

Banerjee et al; "Automatic Program Parallelization"; Proceedings of the IEEE, vol. 81, No. 2, pp. 211-243, 1993 (33 pages).

Cintra et al.; "Design Space Exploration of a Software Speculative Parallelization Scheme"; IEEE Transactions on Parallel and Distributed Systems; vol. 16, No. 5, May 2005; pp. 562-576 (15 pages).

Gupta et al.; "Techniques for Speculative Run-Time Parallelization of Loops"; Supercomputing, Nov. 1998; pp. 1-12.

Rauchwerger et al.; "The LRPD Test: Speculative Run-Time Parallelization of Loops with Privatization and Reduction Parallelization"; IEEE Transactions on Parallel and Distributed Systems; vol. 10, No. 2, Feb. 1999; pp. 1-20 (21 pages).

Lawrence Rauchwerger; "Run-Time Parallelization: It's Time Has Come"; *Department of Computer Science, Texas A&M University,* College Station, Texas, *Parallel Computing*; vol. 24, No. 304; pp. 25; 1998.

Francis Dang, Hao Yu and Lawrence Rauchwerger; "The R-LRPD Test: Speculative Parallelization of Partially Parallel Loops"; *Department of Computer Science, Texas A&M University,* College Station, TX, *IEEE Computer Society*, pp. 10; 2002.

Marcelo Cintra and Diego R. Llanos; "Toward Efficient and Robust Software Speculative Parallelization on Multiprocessors"; *PPoPP'03, ACM*; pp. 13-24; Jun. 2003.

Ding-Kai Chen, Josep Torrellas and Pen-Chung Yew; "An Efficient Algorithm for the Run-time Parallelization of DOACROSS Loops"; *Center for Supercomputing Research and Development, University of Illinois at Urbana-Champaign,* IL; *IEEE*; pp. 10; 1994.

\* cited by examiner

1

USING A CONCURRENT PARTIAL INSPECTOR LOOP WITH SPECULATIVE PARALLELISM

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A typical distributed computer system includes multiple interconnected nodes. Each node in the distributed computer system may include a separate processor. Accordingly, applications which execute in parallel on the distributed computer system are able to exploit the processing power provided by interconnection of the processors. For example, by combining the processing power provided by the multiple interconnected nodes, a given computation may be executed much faster by splitting the computation into multiple segments and executing the each segment of the application in parallel rather than executing the application serially on a single node.

Executing an application across several nodes typically involves determining which portions of the application should be performed serially and which portions of an application may be performed in parallel (i.e., the portion is safe to be performed in parallel). A portion of the application is deemed as parallelizable if the portion may be divided into discrete segments such that each segment in the discrete segments may be executed by an individual thread simultaneously. In contrast, portions of the application that when parallelized would result in thread interdependencies (i.e., data dependencies between threads), such as multiple reads and writes to the same memory space by different threads, typically are not parallelized.

One method of parallelizing an application is for a programmer to analyze the application and determine how to parallelize an application. For example, the programmer may analyze a loop in the application to determine whether there are potential data dependencies between loop iterations within the loop of the application. Once the programmer has determined how to parallelize the loop, the programmer may add in specific instructions, such as message passing interface (MPI), to the application for parallelizing the loop in the application.

Another solution to parallelize the application is for a compiler to add in instructions for parallelizing the application statically at compile time. For the compiler to add the aforementioned instructions, the compiler must analyze the application for possible data dependencies, and determine how to break the application into discrete portions. Ensuring data dependencies are known is challenging if not impossible because many commonly occurring loops have memory accesses that preclude automatic parallelism. Specifically, the loop may have memory references which are only determined at execution time, such as subscripted subscripts (e.g., A[C[i]]=D[i]) and pointer variables (e.g., *ptr=0.50; ptr++).

Another possible solution is to perform the analysis during the execution time using the assumption that the loop is parallelizable. When thread interdependencies are discovered, the loop may be restarted from the beginning in serial or with a new attempt at parallelizing the loop with synchronization.

SUMMARY

In general, in one aspect, the invention relates to a method for executing a loop in an application that includes executing iterations in a first segment of the loop by a base thread, logging memory transactions that occur during execution of iterations in the first segment by a co-inspector thread to obtain a co-inspector log, executing iterations in a second segment of the loop by a co-thread to obtain temporary results, logging memory transactions that occur during execution of iterations in the second segment to obtain a co-thread log, and comparing the co-inspector log and the co-thread log to determine whether a thread interdependency exists.

In general, in one aspect, the invention relates to a system for executing a loop that includes a base thread configured to execute iterations in a first segment of the loop, a co-inspector thread configured to log memory transactions that occur during execution in the first segment of the loop to obtain a co-inspector log, and a co-thread configured to execute iterations in a second segment of the loop to obtain temporary results, and log memory transactions that occur during execution if the loop in the second segment to obtain a co-thread log, wherein the system is configured to compare the co-inspector log and the co-thread log to determine whether a thread interdependency exists.

In general, in one aspect, the invention relates to a computer system for executing a loop in an application that includes a processor, a memory, a storage device, and software instructions stored in the memory for enabling the computer system under control of the processor, to execute iterations in a first segment of the loop by a base thread log memory transactions that occur during execution of iterations in the first segment by a co-inspector thread to obtain a co-inspector log, execute iterations in a second segment of the loop by a co-thread to obtain temporary results, log memory transactions that occur during execution of iterations in the second segment to obtain a co-thread log, and compare the co-inspector log and the co-thread log to determine whether a thread interdependency exists.

Other aspects and advantages of the invention will be apparent from the following description and the appended claims.

DETAILED DESCRIPTION

Figure 1:
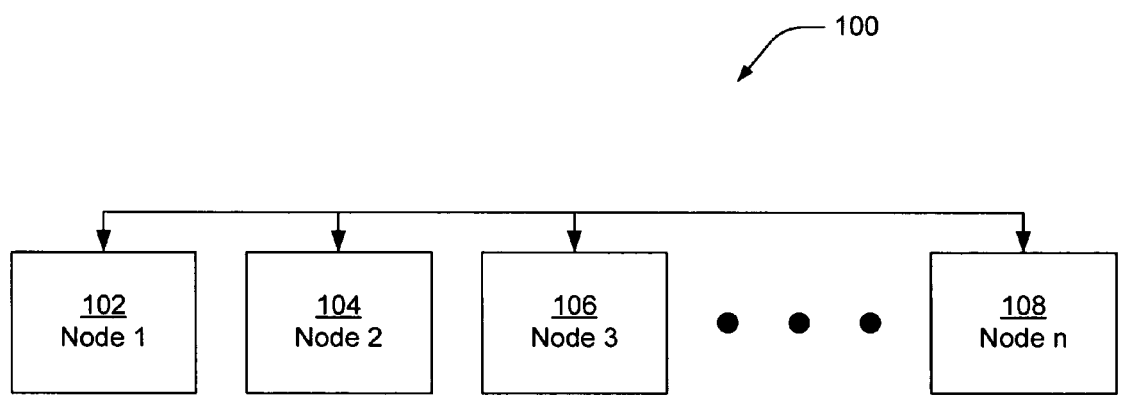
FIG. 1 shows a distributed computer system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for parallelizing a loop at execution time. Specifically, embodiments of the invention provide a method for realizing the performance gain of parallelizing a loop at execution time, by providing concurrent partial runtime inspection of the loop to determine whether the loop (or portions thereof) are parallelizable.

FIG. 1 shows a distributed computer system in accordance with one embodiment of the invention. The distributed computer system (100) corresponds to virtually any type of interconnection of nodes (e.g., node 1 (102), node 2 (104), node 3 (106), node n (108)) in virtually any topology. For example, the nodes (e.g., node 1 (102), node 2 (104), node 3 (106), node n (108)) may be arranged in a star topology, a ring topology, or a tree topology. Alternatively, the distributed computer system (100) may correspond to a multiple processors with shared memory system (i.e., each node is a processor), several interconnected servers, or a group of computers connected over the Internet. Further, the distributed computer system (100) may also include one or more subsystems (not shown), in which the subsystem is of a different type and topology than the parent system (i.e., the distributed system itself may be composed to an aggregation of other distributed systems).

Figure 2:
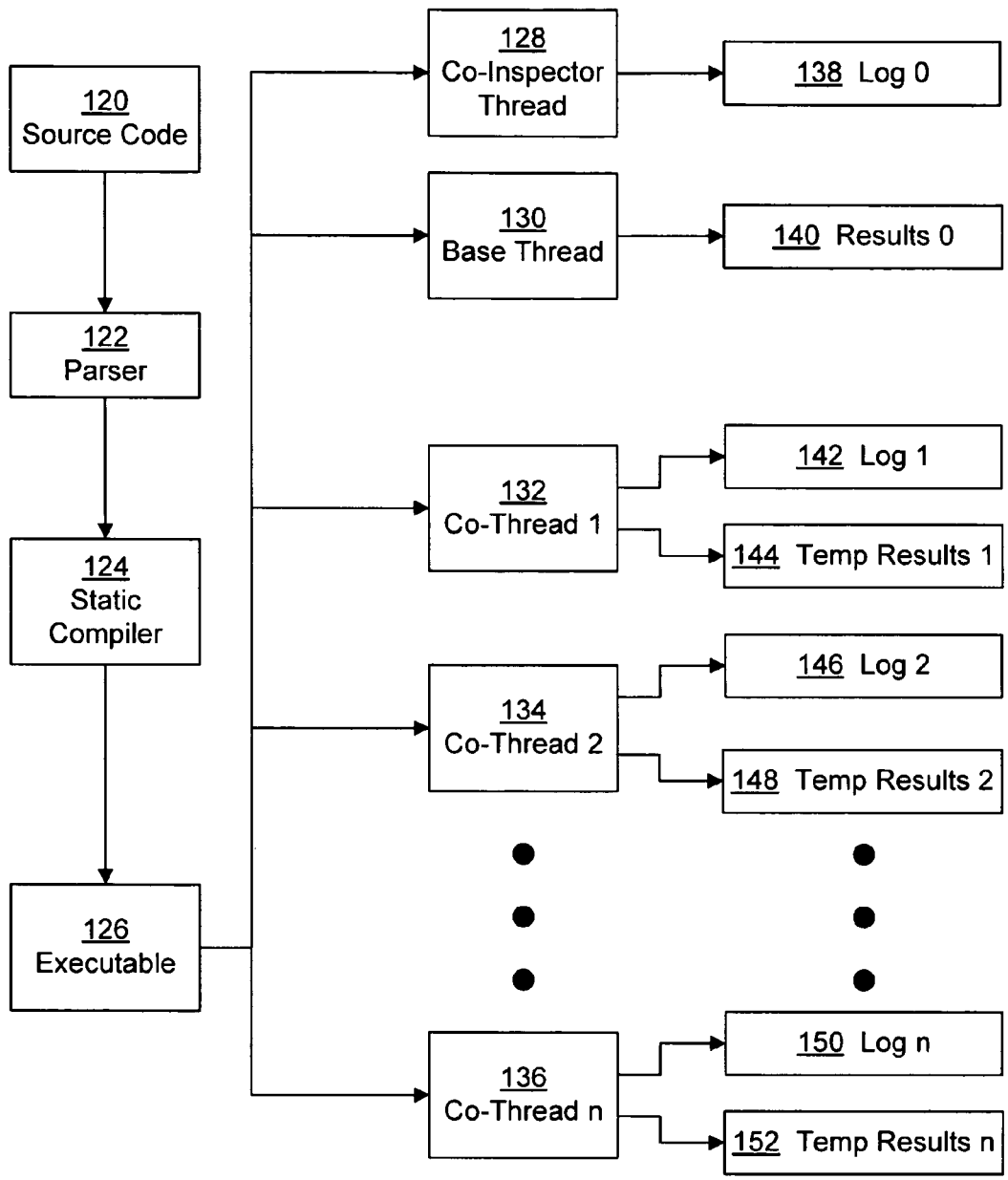
FIG. 2 shows a system for parallelizing a loop in a distributed computer system in accordance with one embodiment of the invention.

FIG. 2 shows a system for parallelizing a loop in a distributed computer system in accordance with one embodiment of the invention. The system includes source code (120), a parser (122), a static compiler (124), an executable (126), a co-inspector thread (128), a base thread (130), and one or more co-threads (e.g., 132, 134, 136). Each of these aforementioned components is described below.

The source code (120) in one embodiment of the invention, corresponds to an application or part of an application written in any programming language, such as JAVA™, C, C++, Fortran, High Performance C, High Performance Fortran, etc. Additionally, in one embodiment of the invention, the source code may include one or more loops, such as a "for" loop, a "while" loop, a "do while" loop, etc. Further, the source code (102) may also include instructions for statically parallelizing the source code (102), such as instructions for Message Passing Interface (MPI), etc.

In one embodiment of the invention, associated with the source code (120) is a parser (122). The parser (122) corresponds to a program that includes functionality to analyze the source code (120) and divide the source code (120) into parsed source code. In one embodiment of the invention, parsed source code may be organized and represented in a parse tree.

Associated with the parser (122), in one embodiment of the invention, is a static compiler (124). The static compiler (124), in one embodiment of the invention, corresponds to a program that includes functionality to transform parsed source code into object code or an executable (126). In one embodiment of the invention, the static compiler (124) may also include functionality to perform a static analysis on the parsed source code to determine which portions of the parsed source code may be performed in parallel. Further, the static compiler (124) may include functionality to determine and flag the portions of parsed source code that may not be parallelized at compile time because of the possibility of thread interdependencies because of indeterminable variables.

An indeterminable variable corresponds to a variable for which memory accesses cannot be determined at compile time, such as subscripted subscripts and pointer variables. Examples of indeterminable variables include A[C[i]]=B[i] and A[i]=function (input parameters). In accordance with one embodiment of the invention, in the aforementioned example, A[C[i]] and A[i] are indeterminable variables and, thus, cannot be parallelized at compile time.

Continuing with the discussion of FIG. 2, the executable (126) corresponds to code which may be executed by threads (e.g., co-inspector thread (128), base thread (130), co-thread 1 (132), co-thread 2 (134), co-thread n (136)) in the distributed computer system. In one embodiment of the invention, the executable (126) may correspond to byte code to be executed on a virtual machine.

Further, associated with the executable (126) may be a runtime parser (not shown) in accordance with one embodiment of the invention. The runtime parser includes functionality to parse the executable and create instrumented code which has the necessary instrumentation added for executing the code in parallel. Specifically, the instrumented code specifies how to divide the code into segments for individual threads (e.g., co-inspector thread (128), base thread (130), co-thread 1 (132), co-thread 2 (134), co-thread n (136)) to execute in parallel. For example, the instrumented code may specify which node is responsible for executing a specific thread. Further, in one embodiment of the invention, the instrumented code may also include functionality to enable threads executing the executable (126) to log memory accesses associated with the indeterminable variables.

In one embodiment of the invention, the thread (e.g., co-inspector thread (128), base thread (130), co-thread 1 (132), co-thread 2 (134), co-thread n (136)) corresponds to a set of instructions in execution. Each thread (e.g., co-inspector thread (128), base thread (130), co-thread 1 (132), co-thread 2 (134), co-thread n (136)) may execute in parallel with other threads (e.g., co-inspector thread (128), base thread (130), co-thread 1 (132), co-thread 2 (134), co-thread n (136)). In one embodiment of the invention, the types of threads include the co-threads (e.g., co-thread 1 (132), co-thread 2 (134), co-thread n (136)), the base thread (130), and a co-inspector thread (128). Each of the aforementioned types of threads is described below.

A co-thread (e.g., co-thread 1 (132), co-thread 2 (134), co-thread n (136)), in one embodiment of the invention, corresponds to a process executing in the system. Specifically, each co-thread (e.g., co-thread 1 (132), co-thread 2 (134), co-thread n (136)) may be configured to execute a segment of the loop. Associated with each co-thread (e.g., co-thread 1 (132), co-thread 2 (134), co-thread n (136)) is a log (e.g., log 1 (142), log 2 (146), log n (150)) and temporary results (e.g., temp results 1 (144), temp results 2 (148), temp results n (152)). The log (e.g., log 1 (142), log 2 (146), log n (150)), in one embodiment of the invention, corresponds to a data store, such as a file, for storing memory accesses performed during execution of the segment of the loop. With the memory accesses, the log (e.g., log 1 (142), log 2 (146), log n (150)) may also have a loop iteration variable and/or an instruction counter specifying when the memory access occurred. In one embodiment of the invention, the log (e.g., log 1 (142), log 2 (146), log n (150)) only stores the memory accesses related to the indeterminable variables. Those skilled in the art will appreciate that in one embodiment of the invention, the co-threads (e.g., co-thread 1 (132), co-thread 2 (134), co-thread n (136)) may share logs (e.g., log 1 (142), log 2 (146), log n (150)). Accordingly, each log (e.g., log 1 (142), log 2 (146), log n (150)) may be associated with one or more co-threads (e.g., co-thread 1 (132), co-thread 2 (134), co-thread n (136)).

Also associated with each co-thread (e.g., co-thread 1 (132), co-thread 2 (134), co-thread n (136)) is temporary results (e.g., temp results 1 (144), temp results 2 (148), temp results n (152)). In one embodiment of the invention, the temporary results (e.g., temp results 1 (144), temp results 2 (148), temp results n (152)) correspond to the results generated during the execution of the segment of the loop by the particular co-thread (e.g., co-thread 1 (132), co-thread 2 (134), co-thread n (136)).

Continuing with FIG. 2, the base thread (130), in one embodiment of the invention, corresponds to a process configured to initially execute a segment of the loop that includes the first iteration of the loop. The segment of the loop that is initially executed by the base thread (130) typically does not overlap with the segments being executed by the aforementioned co-threads (e.g., co-thread 1 (132), co-thread 2 (134), co-thread n (136)).

Continuing with FIG. 2, as the base thread (130) is executed results, denoted as results 0 (140), are generated. In one embodiment of the invention, Results 0 (140) may be committed immediately to memory or may be kept in a temporary file to be committed to memory at a later time.

A co-inspector thread (128), in one embodiment of the invention, corresponds to a process that is configured to execute the same segment of the loop as the base thread (130) and generate a log (log 0 (138)). In one embodiment of the invention, the co-inspector thread (128) is configured to only execute the instrumented portions of the segment of the loop that is executed by the base thread (130). Log 0 (138) corresponds to a data store, such as a log file, for storing the memory accesses that occurred during execution of the aforementioned segment of the loop by the co-inspector thread (128). Those skilled in the art will appreciate that the co-inspector thread (128) may or may not execute on the same node as the base thread (130).

Figure 3:
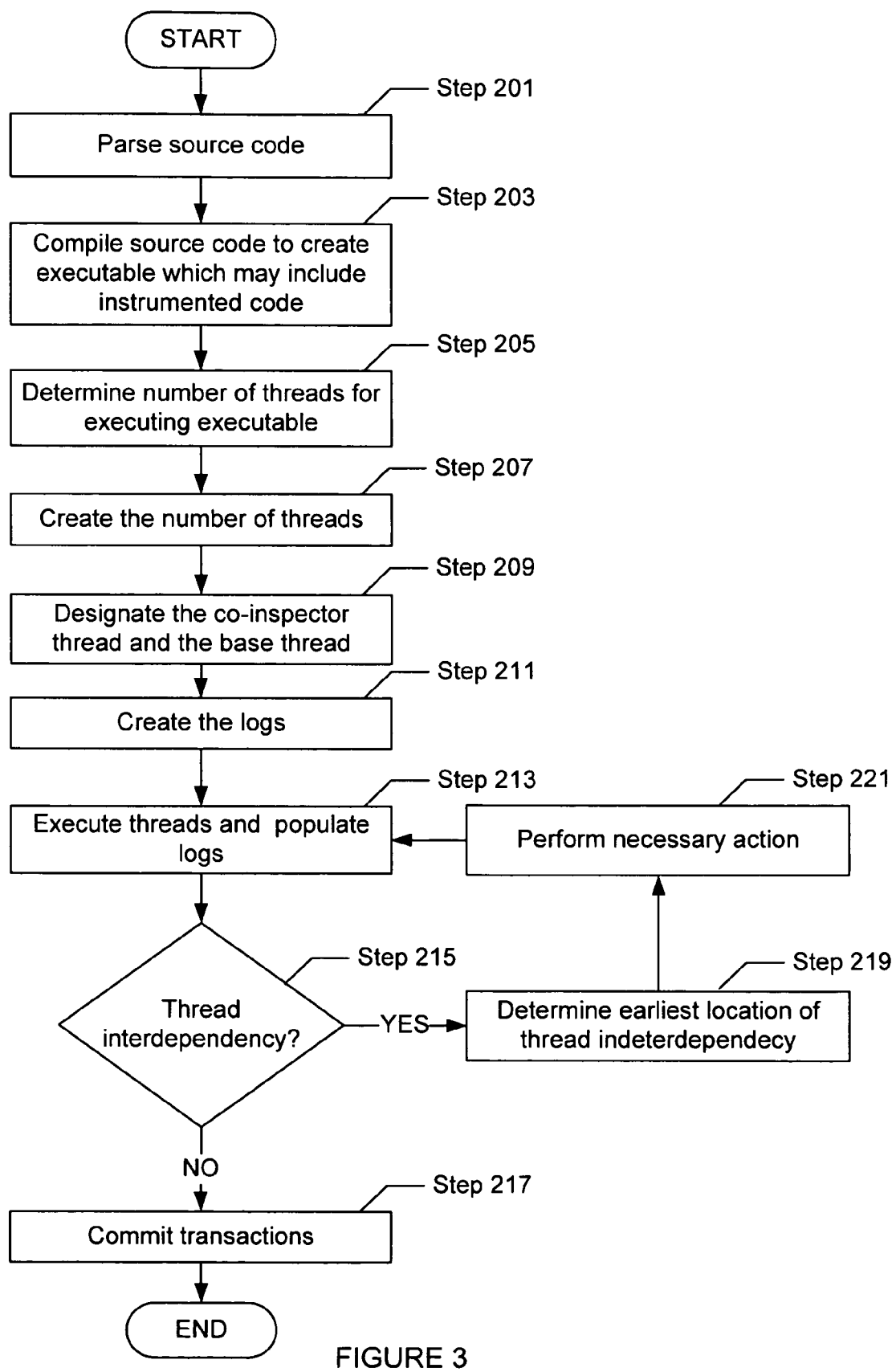
FIG. 3 shows a method for parallelizing a loop in accordance with one embodiment of the invention.

FIG. 3 shows a method for parallelizing a loop in accordance with one embodiment of the invention. Initially, the source code is parsed (Step 201). Next, the parsed source code is compiled to create executable code which may include instrumented code (Step 203). Alternatively, in one embodiment of the invention, after the executable code is created, a runtime parser may create instrumented code (not shown).

After the code is compiled, the number of threads that are to execute the executable code (or a portion thereof) in parallel is determined (Step 205). The number of threads may be specified in the code or input as parameters during execution of the application. Further, in one embodiment of the invention, the number of threads may be determined during runtime by the runtime system depending on the resources available at the time in the system. Once the number of threads is determined, the number of threads may be created (Step 207). In one embodiments of the invention, the number of threads may be created, for example, by initiating execution of the code on separate nodes.

Figure 4:
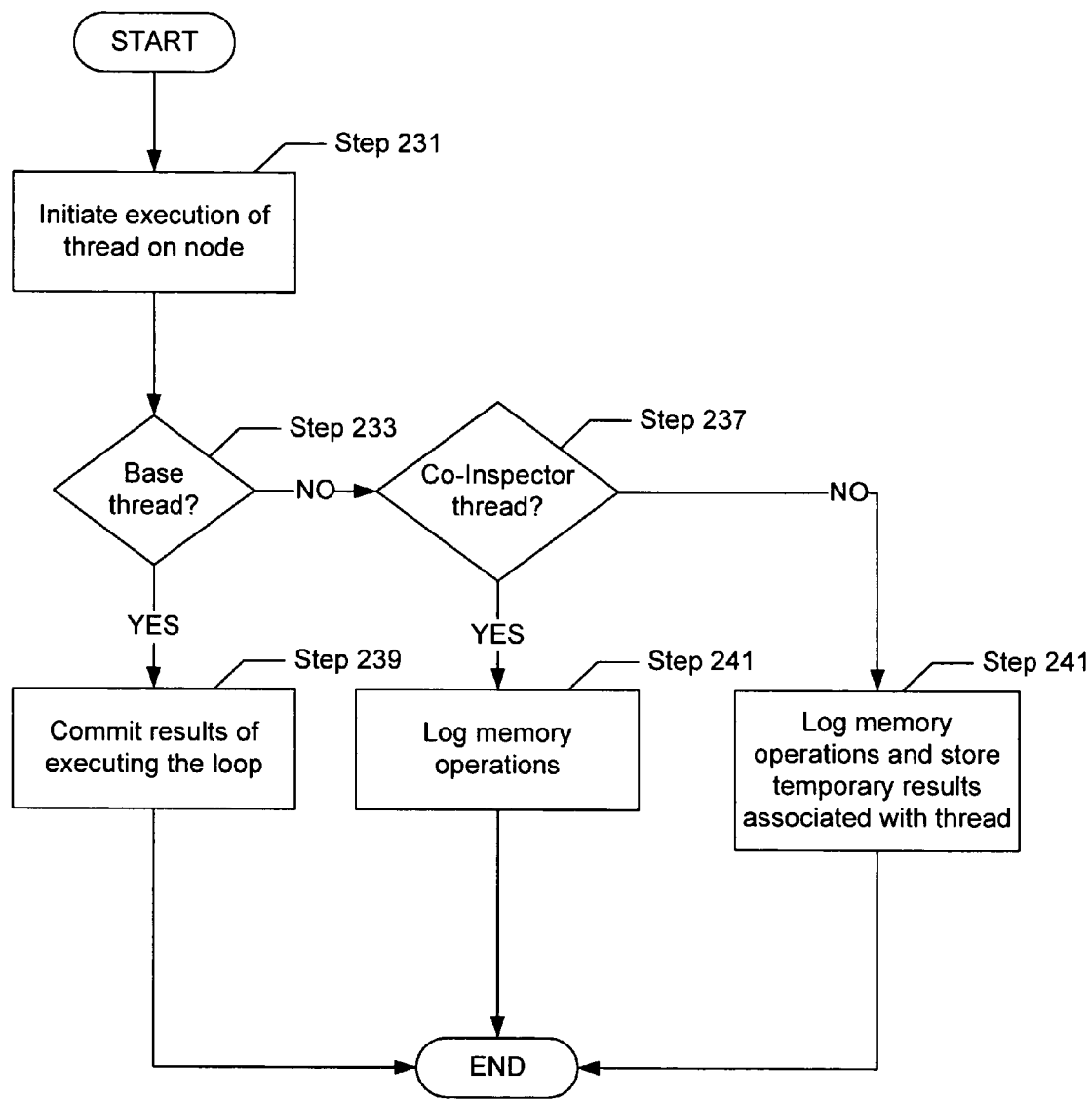
FIG. 4 shows a method for executing a thread in accordance with one embodiment of the invention.

After creating the number of threads, in one embodiment of the invention, one of the threads is designated as the co-inspector thread and one of the threads is designated as the base thread. The remaining threads are designated as co-threads. Next, logs are created for all threads except the base thread (Step 211). In one embodiment of the invention, the creation of the logs in Step 211 corresponds to designating files and/or memory space to store the logs. However, at this stage the logs are typically not populated with any content. Once the logs are created for all threads except the base thread, then all the threads are executed and the corresponding logs are populated (Step 213). FIG. 4, discussed below, shows a method for executing a thread in accordance with one embodiment of the invention.

After executing the threads and populating the logs, a determination is then made whether thread interdependencies exist (Step 215). In one embodiment of the invention, a thread interdependency may occur when two threads access the same memory space and one of the accesses to the memory space modifies the memory space, such as deleting or writing to the memory space. In one embodiment of the invention, the presence of thread interdependency is determined using the logs (e.g., the co-inspector log and the co-thread logs). Specifically, in one embodiment of the invention, thread interdependencies may be determined by comparing each log for a segment with all of the logs for the previous segments. If a data dependency exists between the logs, then in one embodiment of the invention, a thread interdependency is determined.

If no thread interdependencies are present, then in one embodiment of the invention, the transactions may be committed (Step 217). Alternatively, if there is a thread interdependency, then the earliest location of the thread interdependency is determined (Step 219).

In one embodiment of the invention, the earliest location of the thread interdependency may be determined from the second lowest order thread associated with the logs showing the thread interdependency. For example, if a base thread writes to memory space B at loop iteration 30, as shown in the co-inspector log, and co-thread 1 reads from memory space B at loop iteration 290, then the earliest location of thread interdependency is when co-thread 1 reads from memory space B (i.e., at loop iteration 290). Similarly, if co-thread 1 writes to memory space C at loop iteration 500, and co-thread 3 reads from memory space C at loop iteration 700, then the earliest location of thread interdependency is when co-thread 3 reads from memory space C (i.e., at loop iteration 700).

Those skilled in the art will appreciate that there may be different rules regarding what order of reads and modifies constitute a thread interdependency. Accordingly, the determinations of the earliest location of thread interdependency may vary depending on the rules.

Once the location of thread interdependency is determined, then the necessary actions may be performed to address the thread interdependency (Step 221). In one embodiment of the invention, temporary results performed before the earliest location of thread interdependency may be committed, while the temporary results corresponding to the execution of iterations at and after the earliest location are re-executed.

In one embodiment of the invention, thread interdependencies may be determined while the threads are executing. For example, thread interdependencies may be determined after a specific thread (e.g., the base thread, the co-inspector thread, and one of the co-threads) completes executing a specific segment of the loop. After Step 221 has been completed, the method proceeds to Step 213 (described above).

FIG. 4 shows a method for executing a thread in accordance with one embodiment of the invention. Initially, the execution of a thread is initiated on a node (Step 231). Next, a determination is made as to whether the thread is a base thread (Step 233). If the thread is a base thread, then the thread executes the lowest order loop iterations (not shown). For example, if there are 300 iterations in a loop, then the base thread may execute iterations 0-299. Further, in one embodiment of the invention, because the base thread executes the lowest segment of iterations, any operations performed by the base thread with the memory may be deemed safe and therefore committed as the base thread is executing (Step 239).

Alternatively, if the thread is not a base thread, then a determination is made whether the thread is a co-inspector thread (Step 237). If the thread is a co-inspector thread, then in one embodiment of the invention, the co-inspector thread executes the same iterations of the loop as the base thread (i.e., the lowest segment of iterations).

In one embodiment of the invention, the co-inspector thread may execute a subset of the instructions executed by the base thread. Specifically, in one embodiment of the invention, the co-inspector thread only executes the instructions associated with the indeterminable variable(s). In one embodiment of the invention, the aforementioned subset of instructions executed by the co-inspector thread corresponds to the instrumented portions of the loop encountered by the co-inspector thread. For example, if the loop contains the statement 'A[C[i]]' that could not be determined at compile time, then the co-inspector thread may execute instructions for determining the memory address of 'A[C[i]]'. Specifically, the co-inspector thread may only execute instructions related to determining 'A[C[i]]', T, etc. Accordingly, in one embodiment of the invention, the co-inspector thread does not execute instructions that are unrelated to the memory access of 'A[C[i]]', such as accesses to another unrelated variable B[j] if B[j] has not been identified as an indeterminable variable.

Continuing with FIG. 4, if the co-inspector thread exists (Step 237) and is executing, the co-inspector thread may log the memory operations (Step 241). Further, as discussed above, in one embodiment of the invention, the co-inspector thread may only log memory operations when the memory operations are related to indeterminable variables. Because the co-inspector thread performs the same iterations of the base thread, the log associated with the co-inspector thread corresponds to the log that would have been created for the base thread. By having a base thread able to commit transactions immediately and not need to write to a log, the base thread is able to execute more iterations in less time. Accordingly, the use of a co-inspector for logging the transactions performed by the base thread may provide a significant performance gain.

Continuing with FIG. 4, if the thread is neither a base thread nor a co-inspector thread, then, in one embodiment of the invention, the thread is a co-thread. The co-thread executes a set of loop iterations. As the co-thread is executing a set of loop iterations, the co-thread may log the memory operations and store the temporary results generated by executing the loop iterations by the co-thread (Step 241). In one embodiment of the invention, the co-thread may only log memory operations when the memory operations are associated with indeterminable variables.

In one embodiment of the invention, if the co-threads have not completed executing by the time the base thread has finished executing the initial iterations, then the base thread and the co-inspector thread may continue executing. For example, suppose that a loop has 300 iterations and there is a base thread, a co-inspector thread, and a co-thread. The co-thread may be assigned to execute iterations 150-299. Thus, the base thread may start executing iterations 0-149. If the base thread completes execution of iterations 0-149 before the co-thread completes executing iterations 150-299, then in one embodiment of the invention, the base thread may continue by executing iterations 150, 151, 152, etc. Accordingly, the transactions associated with iterations 150, 151, 152, etc. and performed by the base thread may be committed as the base thread is executing. In one embodiment of the invention, the base thread may stop executing, when the co-thread(s) has completed the remaining iterations. Alternatively, those skilled in the art will appreciate that the base thread may halt before the co-threads have completed execution.

Figure 5A:
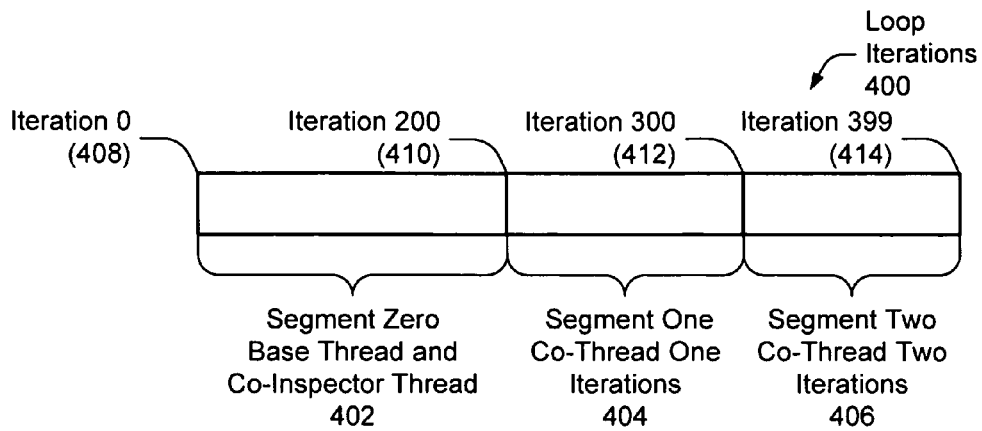
FIG. 5A-5C shows an example of parallelizing a loop in accordance with one embodiment of the invention.
Figure 5B:
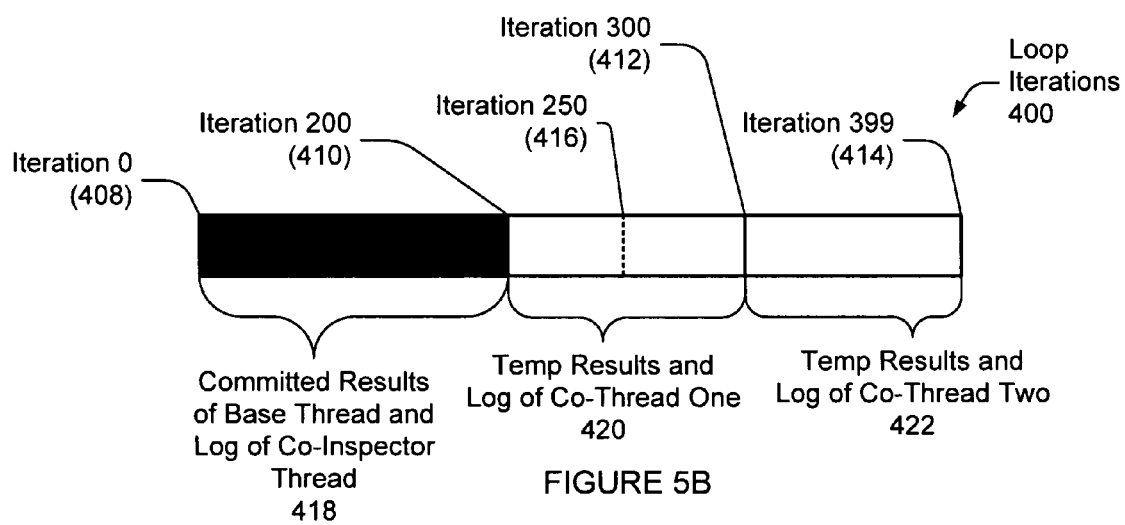
Figure 5C:
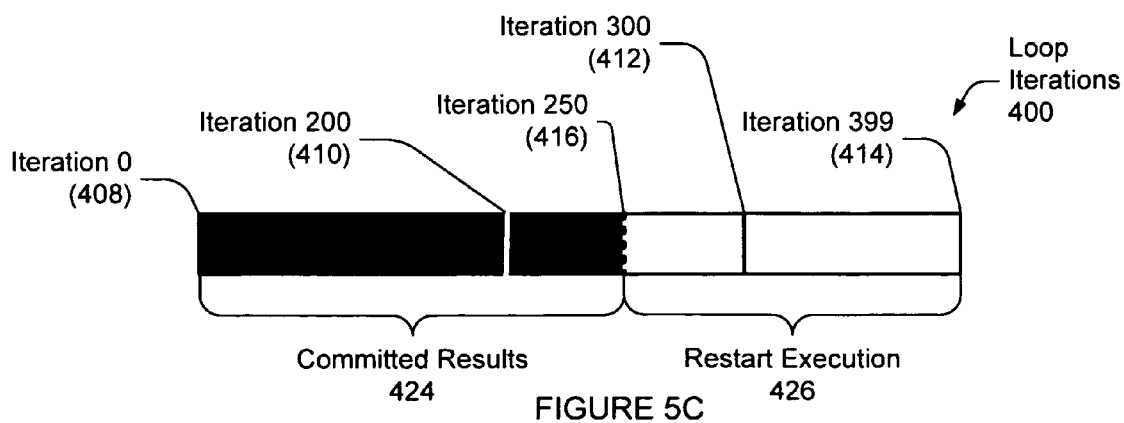

FIG. 5A-5C shows an example of parallelizing a loop in accordance with one embodiment of the invention. Consider for this example, the case in which a loop has 400 iterations (i.e., iteration 0 . . . 399) and there are three threads for executing the 400 iterations. FIG. 5A shows a chart of loop iterations (400) and corresponding threads (e.g., base thread and co-inspector thread (402), co-thread 1 (404), co-thread 1 (406)) for executing specific segments of the loop iterations (e.g., iteration 0 (408), iteration 200 (410), iteration 300 (412), iteration 399 (414)) in accordance with one embodiment of the invention. Specifically, in this example, the base thread and the co-inspector thread (402) execute segment 0 (i.e., iterations between iteration 0 (408) and iteration 199). Co-thread 1 (404) may execute segment 1 (i.e., iterations between iteration 200 (410) and iteration 299). Similarly, co-thread 2 (406) may execute segment 2 (i.e., iterations between iteration 300 (412) and iteration 399 (414)).

FIG. 5B shows an example of the iterations after being executed. As shown in 5B, in one embodiment of the invention, while the base thread is executing, the results are committed and a log is created (418). Further, temporary results and logs are stored for co-thread 1 (420) and co-thread 2 (422). Consider the case that while comparing the logs of the co-inspector thread (418) and the co-thread 1 (420), a thread interdependency is determined at iteration 250 (416). Specifically, the log for co-thread 1 in iteration 250 (416) may show a read from the same memory space as the memory space written to by the base thread (as shown in the log for the co-inspector thread (418)). Accordingly, the earliest location of the thread interdependency may be determined to be at iteration 250 (416) in accordance with one embodiment of the invention.

As shown in FIG. 5C by the blackened portion of the graph, temporary results may be committed (424) up to iteration 250 (416). Further, co-thread 1 may restart execution (426) starting with iteration 250 (416). Likewise, in one embodiment of the invention, co-thread 2 may also restart execution (426) of segment 3. Further, the base thread, in one embodiment of the invention, may halt or continue by executing segment 2.

Figure 6:
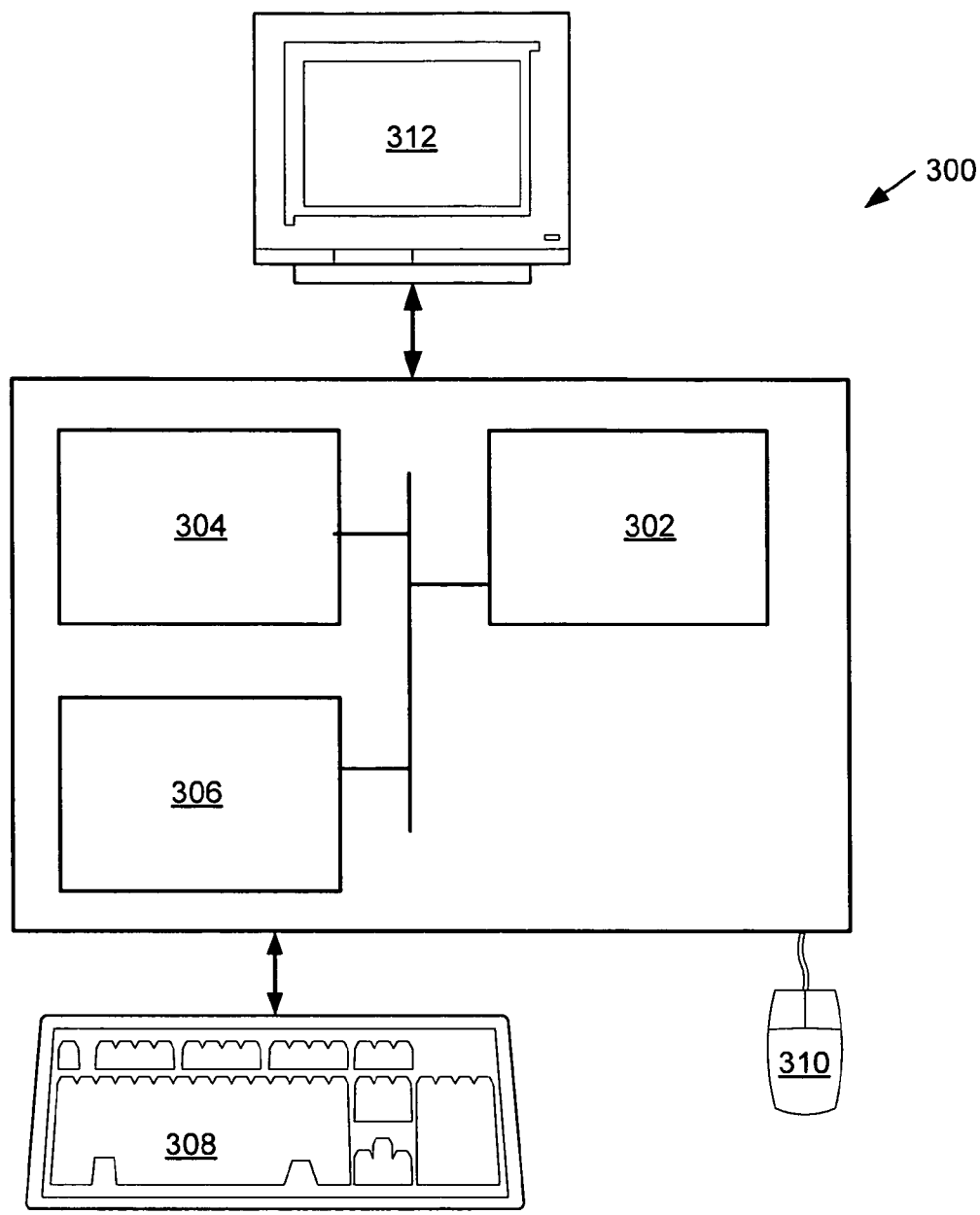
FIG. 6 shows a computer system in accordance with one embodiment of the invention.

The invention may be implemented on virtually any type of computer regardless of the platform being used. For example, as shown in FIG. 6, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., source code, parser, compiler, threads, logs, results, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Embodiments of the invention have one or more of the following advantages. First, embodiments of the invention provide a method for realizing performance gain by executing threads in parallel which is not available when parallelizing only at compile time. Further, by having a co-inspector thread execute the same iterations as the base thread without requiring communication between the two threads allows for greater performance to be achieved by the base thread. Specifically, in the same time frame, the base thread may execute more iterations than the co-threads because the base thread, in one embodiment of the invention, does not have to write to a log file. Rather, transactions performed by the base thread may be committed immediately in accordance with one embodiment of the invention.

Further, by allowing the base thread to continue processing regardless of whether a co-thread has already performed the iterations, one or more embodiments of the invention allow for less overhead associated with restarting the iterations. Additionally, by determining the earliest location of thread interdependency and only restarting co-threads from the earliest location of thread interdependency also greatly reduces the amount of overhead associated with discovering a thread interdependency.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a loop in an application comprising:
    executing iterations in a first segment of the loop by a base thread;
    logging memory transactions that occur during execution of iterations in the first segment by a co-inspector thread to obtain a co-inspector log;
    executing iterations in a second segment of the loop by a co-thread to obtain temporary results;
    logging memory transactions that occur during execution of iterations in the second segment to obtain a co-thread log;
    identifying a thread interdependency by comparing the co-inspector log and the co-thread log;
    determining, after executing iterations in the first segment, a location of the thread interdependency in the second segment;
    committing temporary results up to the location; and
    re-starting execution of the second segment at the location by the base thread.

2. The method of claim 1, wherein the thread interdependency is associated with an indeterminable variable.

3. The method of claim 1, wherein logging the memory transactions by the co-thread comprises:
    executing a subset of instructions associated with an indeterminable variable in the first segment; and
    logging memory transactions associated with the indeterminable variable.

4. The method of claim 1, wherein the loop comprises a plurality of instrumented code instructions.

5. The method of claim 4, wherein the plurality of instrumented code instructions enable logging of indeterminable variables in the loop.

6. The method of claim 1, wherein the base thread, the co-inspector thread, and the co-thread execute in parallel.

7. The method of claim 1, wherein comparing the co-inspector log and the co-thread log occurs after the co-inspector thread completes logging a portion of the first segment.

8. The method of claim 1, wherein comparing the co-inspector log and the co-thread log occurs after the base thread completes logging a portion of the first segment.

9. A computer system for executing a loop comprising:
    a processor; and
    a memory operatively connected to the processor and storing a plurality of instructions comprising functionality to:
        execute iterations in a first segment of the loop by a base thread;
    log memory transactions that occur during execution of iterations in the first segment by a co-inspector thread to obtain a co-inspector log;
        execute iterations in a second segment of the loop by a co-thread to obtain temporary results;
        log memory transactions that occur during execution of iterations in the second segment to obtain a co-thread log;
        identify a thread interdependency by comparing the co-inspector log and the co-thread log;
        determine, after executing iterations in the first segment, a location of the thread interdependency in the second segment;
        commit temporary results up to the location; and
        re-start execution of the second segment at the location by the base thread.

10. The computer system of claim 9, wherein the plurality of instructions further comprise functionality to:
    commit results of the execution of the base thread.

11. The computer system of claim 9, wherein the base thread, the co-inspector thread, and the co-thread execute in parallel.

12. A distributed computer system for executing a loop in an application comprising:
    a first processor;
    a second processor; and
    a memory operatively connected to the first processor and the second processor and comprising software instructions for causing the distributed computer system to perform a method of:
        executing, on the first processor, iterations in a first segment of the loop by a base thread;
        logging memory transactions that occur during execution of iterations in the first segment by a co-inspector thread to obtain a co-inspector log;
        executing, on the second processor, iterations in a second segment of the loop by a co-thread to obtain temporary results;
        logging memory transactions that occur during execution of iterations in the second segment to obtain a co-thread log;
        identifying a thread interdependency by comparing the co-inspector log and the co-thread log;
        determining, after executing iterations in the first segment, a location of the thread interdependency in the second segment;
        committing temporary results up to the location; and
        re-starting execution of the second segment at the location by the base thread.

* * * * *